United States Patent [19]

Fox et al.

[11] 4,101,513

[45] Jul. 18, 1978

[54] CATALYST FOR CONDENSATION OF HYDROLYZABLE SILANES AND STORAGE STABLE COMPOSITIONS THEREOF

[75] Inventors: Frederick J. Fox, Woodbury; Richard W. Noren, St. Paul, both of Minn.; George E. Krankkala, North Hudson, Wis.

[73] Assignee: Minnesota Mining and Manufacturing Company, St. Paul, Minn.

[21] Appl. No.: 764,817

[22] Filed: Feb. 2, 1977

[51] Int. Cl.$^2$ .............................................. C08G 77/04
[52] U.S. Cl. .............................. 526/193; 204/159.13; 526/194; 526/198; 526/222; 526/237; 526/279; 528/12; 528/13; 528/19; 528/23; 528/31; 528/32
[58] Field of Search ................ 260/46.5 R, 46.5 G, 260/46.5 E, 46.5 UA, 46.5 Y, 77.5 A; 204/159.13

[56] References Cited

U.S. PATENT DOCUMENTS

| | | | |
|---|---|---|---|
| 2,883,366 | 4/1959 | Kantor et al. | 260/46.5 R |
| 2,906,734 | 9/1959 | Clark | 260/46.5 R |
| 3,503,925 | 3/1970 | Griffin | 260/46.5 R |
| 3,627,722 | 12/1971 | Seiter | 260/77.5 A X |
| 3,632,557 | 1/1972 | Brode et al. | 260/46.5 G X |

FOREIGN PATENT DOCUMENTS

| | | | |
|---|---|---|---|
| 828,668 | 0000 | Belgium | 260/37 EP |
| 828,669 | 0000 | Belgium | 260/37 EP |
| 828,670 | 0000 | Belgium | 260/37 EP |
| 833,472 | 0000 | Belgium | 260/37 EP |

Primary Examiner—Lewis T. Jacobs
Attorney, Agent, or Firm—Cruzan Alexander; Donald M. Sell; Mark A. Litman

[57] ABSTRACT

Onium catalysts of Group Va, VIa, and VIIa atoms have been found to be radiation activatable catalysts for the hydrolysis of silanes. Anhydrous compositions comprising silanes and the catalyst are storage stable.

44 Claims, No Drawings

CATALYST FOR CONDENSATION OF HYDROLYZABLE SILANES AND STORAGE STABLE COMPOSITIONS THEREOF

The present invention relates to the condensation polymerization of silanes. Polymerizable silanes are those silicon containing compounds which have at least one labile group thereon. With one labile group on the silicon atom, only a dimer would be produced. With two labile groups a linear polymer would result from condensation, and with three or more labile groups, three-dimensional resins (cross-linked) would be generated. Hydrolyzable silanes according to the present invention may be represented by the formula:

$$X_m SiR_{4-m}$$

wherein X is a labile group, R is a hydrocarbyl group, and m is an integer 2, 3 or 4.

By the term labile group, as used in the practice of the present invention is meant any hydrolyzable group and hydrogen. Exemplary labile groups are alkoxy substituted alkoxyl, aryloxy, acyloxy, halogen, and hydrogen, these types of silanes being well known in the art. These labile groups may contain heteroatoms, and may be linear, branched or cyclic as long as the labile group is hydrolyzable.

The term hydrocarbyl is defined in the practice of the present invention as groups resulting from the removal of hydrogen from the carbon atom of a hydrocarbon, including hydrocarbons containing one or more heteroatoms selected from oxygen, sulfur and nitrogen. Exemplary hydrocarbyl groups incude aromatic groups containing one to ten carbons (e.g., phenyl, naphthyl and benzothienyl) and aliphatic groups containing 1 to 18 carbon atoms. The aliphatic groups may be linear, branched or cyclic (e.g., methyl, ethyl, isopropyl, propyl, cylohexyl, octyl, dodecyl, octadecyl, ethoxyethyl, ethoxyethoxyethyl, thioethoxyethyl, tetrahydrofuryl, tetrahydrothienyl, dioxanyl, etc.). The hydrocarbyl group may be substituted with a non-basic functional or non-functional group such as halogen, alkoxy, epoxy, phenoxy, cyano, vinyl, allyl, acryloxy, methacryloxy and the like.

Exemplary classes of polymerizable silanes are hydrolyzable silanes falling within the general formula as silanes, silanols, siloxanes, alkoxysilanes, aryloxysilanes, acyloxysilanes, haloalkylsilanes, haloarylsilanes, etc. It is generally well known in the silane condensation art that almost any functional group can be introduced into the side chain of an alkyl or aryl-sbustituted silane without affecting functionality of the silane during condensation, so that a detailed description of operations substituents is unnecessary.

Specific compounds falling into the broad class of polymerizable silanes are, for example:

$(CH_3)_3SiOCH_3$ $CH_3Si(OCH_3)_3$ $CH_3Si(OC_6H_{13})_3$ $(CH_3)_2Si(OC_2H_5)CH\!=\!CH_2$ $$(CH_3)_2Si\!\diagup\!\!\!\!\begin{array}{c}OC(CH_3)_2\\|\\OC(CH_3)_2\end{array}$$

$CH_3Si(C_6H_5)(OC_2H_5)_2$ $H_3C(CH_2)_3Si(OCH_3)_3$ $(NC_5H_4)SiCH_3(OC_2H_5)_2$ $H_2C\!=\!C(CH_3)COO(CH_2)_3SiCH_3(OC_2H_5)_2$ $H_3C\!-\!CH_2\!-\!O\!-\!CH_2\!-\!CH_2\!-\!SiCH_3(OC_2H_5)_2$ $Si(OCH_3)_4$ $(CH_2\!=\!CH\!-\!CH_2)_2Si(OCH_3)_2$

It is also known that polymers having at least one pendant or terminal polymerizable silane group may be cured by various techniques.

Exemplary curable silyl-substituted polymers are the polymerizable silane-terminated polyurethanes described in U.S. Pat. No. 3,632,557 (particularly col. 5, line 57 to col. 6, line 6) and the free raidcal polymerized polymers of olefinically unsaturated silanes and their copolymers with other copolymerizable olefinically unsaturated monomers such as are described in U.S. Pat. Nos. 3,449,293; 3,453,230; 3,542,585 and 3,706,697.

Specific examples of a silyl-substituted polymer have the structures:

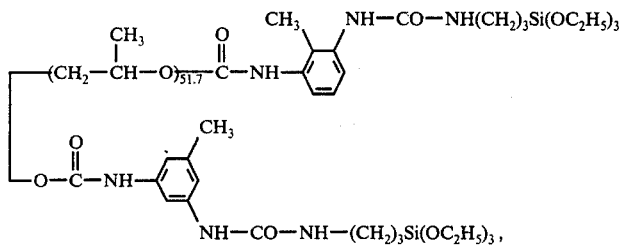

-continued

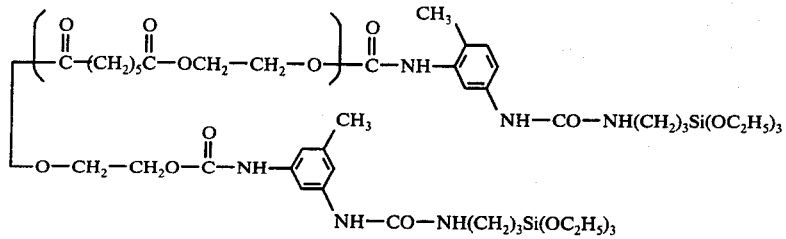

a polymer having a weight average molecular weight of about 900 and containing units having the structure:

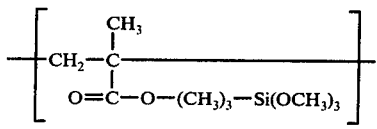

Various techniques are known in the art for controlling the condensation or hydrolysis reaction. Many different catalyst systems for condensation of silanes are also known in the art. Each of the various techniques and catalysts adds its own particular qualities to the requirements of the reaction and the properties of the product. For example, strong acids favor the formation of low molecular weight cyclic polymer units, silanols are stabilized in nearly neutral solutions and preferentially condense to siloxanes in the presence of strong bases, Lewis acid metal salt catalyst such as stannous chloride require heat, and hydrolyzable metal esters will cure at room temperatures. Combinations of the catalysts and reaction conditions can be used to adjust these variables to a most desired balance for a particular intended use.

The present invention relates to a new catalyst system for hydrolyzable silanes which catalyzes the condensation reaction of silanes. These catalysts are storage stable when anhydrously mixed with the silane and are activated by incident radiation in the presence of catalytic amounts of moisture (e.g., atmospheric moisture is sufficient). The catalysts of this invention are rapid acting catalysts and generate polymers with excellent properties.

More particularly the present invention relates to storage stable anhydrous compositions of a hydrolyzable silane and an onium catalyst and to a process of condensing hydrolyzable silanes in the presence of onium catalysts.

An onium catalyst useful in the practice of the present invention is an aromatic, organic adduct of an aromatic organoatomic cation of a Group Va, VIa, or VIIa atom particularly phosphorous, antimony, sulfur, nitrogen, and iodine atoms, and an anion. Aromatic, as used in the description of the groups on the catalysts of the present invention means an aromatic ring (hydrocarbon, or 5, 6 or 7 membered heterocycle comprised of only C, N, S, O, and Se atoms with no more than one atom in the ring selected from S, O, or Se atoms) so attached to the nominative atoms that it is at least as electron withdrawing as benzene. For example, phenacyl

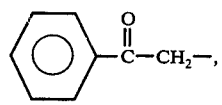

would be a useful aromatic group (being at least as electron withdrawing as benzene), but benzyl

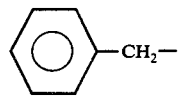

would not be useful because of instability of the compound which would impair storage stability. Representative aromatic rings are phenyl, naphthyl, thienyl, pyranyl, furanyl and pyrazolyl, substituted or not.

*For purposes of convenience in describing these onium catalysts, the Group Va, VIa, or VIIa atom that provides the major nomenclature for the adduct (e.g., phosphorous in phosphonium, sulfur in sulfonium, iodine in iodonium, etc.) will be called the nominative atom.

A descriptive formula for the onium catalysts of the present invention would be

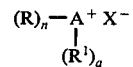

wherein R is an aromatic group at least as electron withdrawing as benzene, $R^1$ is R or alkyl (straight, branched, cyclic or substituted) or alkenyl having 1 to 18 carbn atoms, n is a positive whole integer of at least 1 (preferably 2) up to the valence of A plus one, a is 0 or a positive whole integer of up to the valence of A (preferably A minus 1), n plus a is equal to the valence of A plus one, A is a group Va, VIa, or VIIa atom, and X is an anion, with the proviso that when A is halogen, n is at least 2.

These onium materials are already known in the art. For example, Belgian Pat. Nos. 833,472; 828,668; 828,669; and 828,670 show the use of certain onium compounds as cationic polymerization catalysts for specific monomers such as organosilicon cyclics, vinyl resins, cyclic ethers, cyclic esters, cyclic sulfides, epoxy resins, phenolic resins, polyamines, lactones, styrene, urea/formaldehyde and melamine/formaldehyde resins. The only known disclosure of utility in these references with regard to silicon containing polymers is in Belgian Pat. No. 828,670 wherein cyclic organosilicons are polymerized by a ring opening catalytic action, much in the same manner that epoxy resins are polymerized. No catalysis for silane condensation as described in the present invention is shown. Other organo groups attached to the Group Va, or VIa nominative atom can be the same aromatic group or a substituted or unsubstituted alkyl or cycloalkyl group. The organo groups may also be directly attached one to another via a bond, a methylene group, a —CO— group, an $SO_2$ group, an oxygen, or sulfur or the like. One or more of the organo groups can share two atoms in a condensed ring system.

Specific classes of hydrolyzable silanes for use in the compositions of the invention are those having the general formulae:

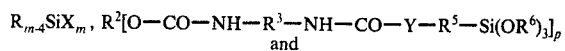

and

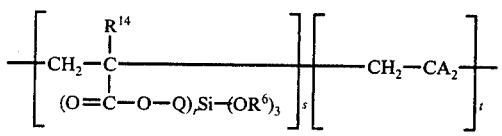

and wherein R, X, and $m$ are as defined herein above and $R^2$ is a polyvalent radical which is the residue resulting from the removal of p hydroxyl groups from a polyhydroxy compound having a molecular weight of from 200 to 6000, p is an integer of from 1 to 6. $R^3$ is a divalent alkylene group having from 1 to 18 carbon atoms or a divalent aromatic radical having from 6 to 18 carbon atoms and is the alkyl or aromatic portion of a diisocyanate compound on removal of the isocyanate groups. $R^3$, for example, can be aliphatic, cycloaliphatic, araliphatic or aromatic. $Y$ is a divalent bridging group selected from —O—, —S—, and —$NR^4$— wherein $R^4$ is hydrogen or a lower alkyl group having from 1 to 6 carbon atoms. $R^5$ is a divalent hydrocarbon radical or a divalent hydrocarbon ether radical having from 1 to 18 carbon atoms, and $R^6$ is a lower alkyl group having 1 to 6 carbon atoms or phenyl, wherein $R^{14}$ is hydrogen or methyl, Q is an alkylene group of up to 4 carbon atoms and A is selected from hydrogen, methyl, chlorine, alkoxycarbonyl having 2 to 18 carbon atoms, phenyl, and nitrile and at least one A is hydrogen, methyl or chlorine. $s$ has a value of at least 1 and the sum of $s$ and $t$ is between about 2 and 40; and $r$ is 0 or 1.

The preferred hydrolyzable silicon-containing compounds are epoxy-terminated silanes having the general formulae:

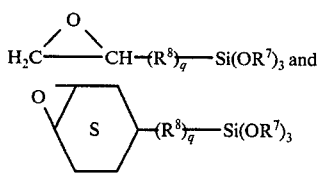

where $R^8$ is a non-hydrolyzable divalent hydrocarbon group (aliphatic, aromatic, or aliphatic and aromatic containing) of less than 20 carbon atoms or a divalent group of less than 20 carbon atoms composed of C, H, N, S and O atoms (these atoms are the only atoms which may appear in the backbone of the divalent group), the last being in the form of ether linkages. No two heteroatoms may be adjacent within the backbone of the divalent hydrocarbon group. This description defines divalent hydrocarbon groups for the hydrolyzable epoxy-terminated silanes in the practice of this invention. The value of $q$ is 0 or 1 and $R^7$ is an aliphatic hydrocarbon group of less than 10 carbon atoms, an acyl group of less than 10 carbon atoms, or a group of formula $(CH_2CH_2O)_kZ$ in which $k$ is an integer of at least 1, and Z is an aliphatic hydrocarbon group of less than 10 carbon atoms or hydrogen.

Suitable hydrolyzable epoxy-terminated silanes for use in the compositions employed in this invention can be a silane of the above formula in which $R^8$ is any divalent hydrocarbon group such as methylene, ethylene, decalene, phenylene, cyclohexylene, cyclopentylene, methylcyclohexylene, 2-ethylbutylene and allene or an ether group such as —$CH_2$—$CH_2$—O—$CH_2$—$CH_2$—, $(CH_2—CH_2O)_2$—$CH_2$—$CH_2$—,

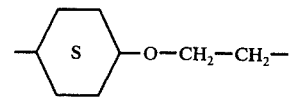

and —$CH_2O$—$(CH_2)_3$—, $R^7$ can be any aliphatic hydrocarbon group of less than 10 carbon atoms such as methyl, ethyl, isopropyl, butyl, vinyl, alkyl, or any acyl group of less than 10 carbon atoms such as formyl, acetyl, propionyl, or any group of the formula $(CH_2CH_2O)_kZ$ in which $k$ is an integer of at least 1, for example 2, 5, and 8, and Z is hydrogen or any aliphatic hydrocarbon group of less than 10 carbon atoms such as methyl, ethyl, isopropyl, butyl, vinyl and allyl.

In addition to any of the above hydrolyzable epoxy-terminated silanes, any hydrolyzate or precondensate of the said silanes can be used in the compositions of the invention. These hydrolyzates can be formed by the partial or complete hydrolysis of the silane $OR^7$ groups. Thus, the term precondensate includes siloxanes in which some or all of the silicon atoms are bonded together through oxygen atoms.

Also, it is within the scope of the invention to include in the composition up to about 50% of other hydrolyzable compounds which will copolymerize with the hydrolyzable silane compound. Such compounds include those having the general formula $R_sM(OR^7)_{t-s}$ wherein M is Al, Zr, or Ti; R and $R^7$ are as defined before, t is the valence of M; and s has the value of 0, 1, 2 or 3 when t is 3 and s has the value of 0, 1, 2, 3 or 4 when t is 4. Illustrative of compounds of this type are $Ti(OC_2H_5)_4$, $Ti(OC_3H_7)_4$, $Ti(OC_4H_9)_4$, $Al(OC_2H_5)_3$, $Al(OC_4H_9)_3$, $(C_2H_5)_2Al(OC_2H_5)_2$, and $Zr(OC_3H_7)_4$.

Additionally, materials copolymerizable with silanes (or in the case of epoxy-terminated silanes, with epoxy groups) may be added to the reactive compositions. Conventional additives such as fillers, dyes, flow control agents, thickeners, radiation absorbers (e.g., ultraviolet radiation absorbers to enhance the radiation sensitivity of the catalysts), and such additives as are known to be desirable in silane or siloxane compositions may be used within the scope of the present invention. The most preferred epoxy-terminated silanes are those represented by the formula:

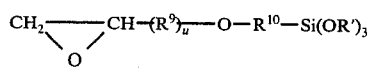

wherein $R^9$ and $R^{10}$ are independently alkylene groups of up to 4 carbon atoms, R' is an alkyl group of up to 6 carbon atoms, and $u$ is 0 or 1.

The presence of catalytic amounts of moisture has been found to be necessary in the initiation of the condensation of silanes in the practice of this invention. Atmospheric moisture will usually be sufficient, but water may be added to the system if desired or if polymerization is needed in the absence of air for any particular application.

Examples of suitable onium salts include, but are not limited to:

A. Onium Salts Having a Periodic Group Va Cation
4-acetophenyltriphenylammonium chloride
Diphenylmethylammoniumtetrafluoroborate
Tetra(4-chlorophenyl)phosphonium iodide
Tetraphenylphosphonium iodide
Tetraphenylphosphonium hexafluorophosphate
(4-bromophenyl)triphenylphosphonium hexafluorophosphate
Tetraphenylarsonium tetrafluoroborate
Tetraphenylbismonium chloride
Di-(1-naphthyl)dimethylammonium tetrafluoroborate
Tri-(3-thienyl)methylammonium tetrafluoroborate
Diphenacyldimethylammonium hexafluorophosphate Examples of these and other onium salts and their preparation are disclosed in Belgium Patent 828,668.

B. Onium Salts Having a Periodic Group VIa Cation
Triphenylsulfonium hexafluoroantimonate
4-chlorophenyldiphenylsulfonium tetrafluoroborate
Triphenylsulfonium iodide
4-cyanophenyldiphenylsulfonium iodide
Triphenylsulfonium sulfate
2-Nitrophenylphenylmethylsulfonium sulfate
Triphenylsulfonium acetate
Triphenylsulfonium trichloroacetate
Triphenyl teluronium pentachlorobismutate
Triphenyl selenonium hexafluoroantimonate Examples of these and other onium salts having a Periodic Group VIa cation and their preparation are given in Belgium Pat. Nos. 828,670 and 833,472 and assignee's copending U.S. patent application Ser. No. 609,897, filed Sept. 2, 1975.

C. Onium Salts Having a Periodic Group VIIa Cation
Diphenyliodonium iodide
4-Chlorophenylphenyliodonium iodide
Diphenyliodonium chloride
4-Trifluoromethylphenylphenyliodonium tetrafluoroborate
Diphenyliodonium sulfate
Di(4-methoxyphenyl)iodonium chloride
Diphenyliodonium trichloroacetate 4-methylphenylphenyliodonium tetrafluoroborate
Diphenylbromonium chloride
1-(2-carboethoxynaphthyl)phenyliodonium chloride
2,2'-Diphenyliodonium hexafluorophosphate Examples of these and other halonium salts and their preparation are disclosed in Belgium Pat. No. 828,669 and assignee's copending U.S. patent application Ser. No. 609,898, filed Sept. 2, 1975.

The amount of latent photocatalytic onium salt used in the photopolymerizable compositions of the invention is not critical but can be from about 0.01 to about 10.0% by weight of polymerizable silane, and preferably 0.5 to 5% by weight of the total weight of condensable silane composition. The use of greater amounts of onium salt generally does not afford increased polymerization and the use of less tends to reduce the extent of polymerization.

The compositions of the invention are prepared by mixing the onium salt with the hydrolyzable silicon-containing compound until a solution is formed. Because many of the onium salts have limited solubility in the silicon-containing compound, it is often preferable to first dissolve the onium salt in a liquid diluent that is inert to the components of the composition and then mix this solution into the silicon-containing compound.

Suitable inert diluents include alcohols such as ethanol, esters such as ethyl acetate, ethers such as diethyl ether, halohydrocarbons such as dichloroethane, and nitriles such as acetonitrile. For storage stability, these solvents and the solutions must be anhydrous.

The compositions of the invention can be used for preparation of coatings for various substrates; however, oils, sealants, caulking materials and rubbers can also be prepared from the compositions of the invention and are particularly usful where such materials need be prepared in situ by irradiation. The compositions of the invention can be applied to substrates by spraying, brushing, dipping, roller coating, flow coating or any of the methods used in commercial coating operations.

The compositions of the invention may contain certain additives to alter the properties of the polymerized or cured product. Thus, there may be added dyes, pigments, plasticizers, fillers and the like as long as these materials do not prevent sufficient penetration into the composition by radiation effective for activating the photocatalytic onium salt.

The photopolymerization and curing of the compositions of the invention occurs on exposure of the composition to any source of radiation emitting actinic radiation at a wavelength within the ultraviolet and visible range of the spectrum to which the photocatalyst has absorption peaks. Suitable sources of radiation include mercury, xenon, carbon arc and tungsten filament lamps, sunlight, etc. Exposures may be less than one second to ten minutes or more depending upon the amounts of particular hydrolyzable silane materials and photocatalytic onium salt being utilized and upon the radiation source, distance from the source and the thickness of the material being polymerized. The composition may also be polymerized by exposure to electron beam irradiation. Dosages of from less than 1 megarad to 100 megarads or more are generally necessary to effect polymerization or curing. By use of electron beam irradiation, highly filled compositions can be effectively cured at a faster rate than by exposure to actinic radiation.

The polymerization or curing of the composition is a triggered reaction, i.e., once degradation of the photocatalytic onium salt has been initiated by exposure to radiation, the polymerization or curing proceeds and will continue even after terminating radiation. The use of thermal energy during or after exposure to radiation greatly accelerates polymeriaztion or curing.

The preferred latent photocatalytic onium salts for use with the preferred hydrolyzable epoxy-terminated silanes are of two types, viz., the aromatic iodonium and the aromatic sulfonium salts of halogen-containing complex anions and highly fluorinated aliphatic sulfonic and sulfonylic protonic acids.

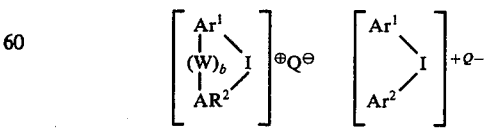

wherein $Ar^1$ and $Ar^2$ are aromatic groups having 4 to 20 carbon atoms and are selected from phenyl, naphthyl, thienyl, furanyl and pyrazolyl groups; W is selected from

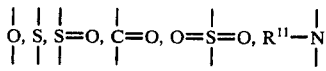

where $R^{11}$ is aryl of 6 to 20 carbon atoms or acyl of 2 to 20 carbon atoms (such as phenyl, acyl, benzoyl, ets.); a carbon-to-carbon bond; or $R^{12}$—C—$R^{13}$, where $R^{12}$ and $R^{13}$ are selected from hydrogen, alkyl groups of 1 to 4 carbon atoms, and alkenyl groups of 2 to 4 carbon atoms; and $b$ is zero or 1; and Q is a halogen-containing complex anion selected from tetrafluoroborate, hexafluorophosphate, hexafluoroarsenate, hexachloroantimonate and hexafluoroantimonate; a fluoroaliphatic sulfonic acid; a bis(fluoroaliphaticsulfonyl)methane; or a bis(fluoroaliphaticsulfonyl)imide. Fluoroaliphatic sulfonic acids, methanes and imides and their preparation are disclosed in assignee's copending patent application Ser. No. 659,527, filed Feb. 19, 1976 which is incorporated herein by reference. Preferred compounds from this group include those where $n=0$. Further preferred materials have $Ar^1$ and $Ar^2$ as a phenyl group.

The aromatic sulfonium salts are of the formulae:

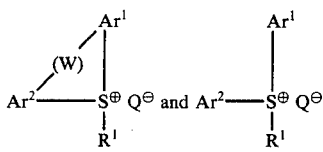

wherein $Ar^1$ and $Ar^2$ can be the same or different, selected from aromatic (as defined above for aromatic iodonium salts) and $R^1$, W, and Q are the same as defined before. Preferred compounds of this class are those in which $Ar^2$ and $R^1$ are phenyl.

Suitable examples of the preferred aromatic onium salt photocatalysts include:
diphenyliodonium tetrafluoroborate
diphenyliodonium hexafluorophosphate
diphenyliodonium hexafluoroarsenate
diphenyliodonium hexachloroantimonate
diphenyliodonium hexafluoroantimonate
diphenyliodonium bis(trifluoromethylsulfonyl)methane Other suitable preferred aromatic onium salt photocatalysts are the corresponding triphenylsulfonium salts. Still other preferred salts are listed in assignee's copending Ser. No. 609,898, and include triphenylsulfonium hexafluorophosphate, tritolylsulfonium hexafluorophosphate, methyldiphenylsulfonium tetrafluoroborate, etc.

The aromatic iodonium salt photocatalysts useful in the photopolymerizable compostions of the invention are of themselves photosensitive only in the ultraviolet. They, however, are sensitized to the near ultraviolet and the visible range of the spectrum by sensitizers for known photolyzable iodonium compounds in accordance with the teachings of U.S. Pat. No. 3,729,313 which is incorporated herein by reference. Illustrative sensitizers include aminotriarylmethane dyes and colored aromatic polycyclic hydrocarbons.

The aromatic sulfonium salt photocatalysts are also generally only sensitive in the ultraviolet. They, too, are sensitized to the near ultraviolet and visible range of the spectrum by aromatic tertiary amines and aromatic polycyclic compounds having at least three fused benzene rings and having an ionization energy less than about 7.9 ev, as calculated by the method of F. A. Matsen, J. Chem. Physics 24, 602 (1956). Such teachings are found in assignees's copending application Ser. No. 609,896, filed Sept. 2, 1975, which is incorporated herein by reference to show the state of the art in this regard.

The preferred compositions of the invention containing hydrolyzable epoxy-terminated silanes and an aromatic iodonium or sulfonium salt having an anion of halogen-containing complex, or highly fluorinated aliphatic sulfonic or sulfonylic protonic acid as photocatalyst can also contain up to about 50% by weight or more of a comonomer which is capable of cationic polymerization such as styrene, methyl styrene, vinyl amides and vinyl ethers. The most preferred cationically polymerized comonomers, however, are the epoxy compounds such as 1,4-butanediol diglycidyl ether, the diglycidyl ether of bis-phenyl A, 3,4-epoxycyclohexylmethyl 3,4-epoxycyclohexanecarboxylate, and 1,4-bis(2,3-epoxypropoxy)butane.

In the following examples which will serve to illustrate the present invention, all parts are parts by weight and all percentages are given as percentages by weight, unless otherwise indicated.

EXAMPLE 1

To 100 parts of dimethyldimethoxysilane was added 1 part of diphenyliodonium chloride. The anhydrous mixture was stirred to dissolve the catalyst and then a layer 5 mm thick was exposed, in the presence of atomspheric moisture, to the radiation of a mercury vapor lamp at a distance of 7 inches (17.5 cm). After about one minute, the mixture had polymerized to a viscous material having a viscosity of about 1,000,000 centipoise.

Similar results were obtained when the diphenyliodonium chloride was replaced by diphenyliodonium iodide, diphenyliodonium hexafluorophosphate, triphenylsulfonium chloride, triphenylsulfonium hexafluoroantimonate and triphenylsulfonium bis(trifluoromethylsulfonyl)methane.

The above experiments were repeated for each catalyst using amounts of the photocatalysts ranging from 0.05 to 5% by weight, and similar results were obtained. Samples of each of the unpolymerized anhydrous compositions when stored in the absence of moisture and light remained unpolymerized for at least two months.

EXAMPLE 2

Into 100 parts of phenyltriethoxysilane was added 2.5 parts of diphenyliodonium chloride and 0.25 parts of 2-ethyl-9,10-dimethoxyanthracene. The composition was stored in a tightly stoppered brown bottle. After at least two months, the composition was still fluid. The composition was coated onto polyethyleneterephthalate and exposed to a 275 watt sunlamp at a distance of five inches (12.7 cm). After about one hour, a friable film was obtained. Similar results were obtained when diphenyliodonium iodide, diphenyliodonium hexafluorophosphate, triphenylsulfonium chloride, triphenylsulfonium hexafluoro-antimonate, and triphenylsulfonium bis(trifluoromethylsulfonyl)methane was used in place of diphenyliodonium chloride.

EXAMPLE 3

A trialkoxysilyl-endcapped polymer was prepared by conjointly reacting polyoxypropylene glycol (molecular weight 3000), toluene diisocyanate, and γ-aminopropyltriethoxysilane. To 100 parts of this polymer was added 1 part of diphenyliodonium chloride and 0.2 parts of 2-ethyl-9,10-dimethoxyanthracene in 15 ml of ethyl acetate. The mixture was stirred until all materials were completely dispersed. The mixture was pressed into a squeeze tube and sealed therein. After two weeks, a thin bead of the material was pressed from the tube and exposed to a sunlamp for about five minutes whereon it cured to a tough rubbery material.

When the experiment was repeated using triphenylsulfonium bromide in place of the diphenyliodonium chloride, even after three months, the material could be squeezed from the squeeze tube and cured by exposure to a sunlamp for about five minutes.

EXAMPLE 4

Example 2 was repeated using vinyltriethoxysilane in place of phenyltriethoxysilane. After two minutes exposure to a sunlamp, a coherent film had formed which could be stripped from the substrate as a self-supporting film. When the mixture was coated onto polyethyleneterephthalate primed with polyvinylidenechloride, a tenaciously adherent film was obtained that had water repellent characteristics.

When the example was repeated using as catalyst di(4-tolyl)iodonium hexafluorophosphate, the coating mixture also cured in about two minutes.

EXAMPLE 5

An oligomer having pendant trimethoxy silane groups was prepared by heating in an oil bath at 80° C a mixture of 87.3 parts of γ-methacryloxypropyltrimethoxysilane, 12.7 parts of 3-mercaptopropanediol-1,2 and 0.500 parts azobisisobutyronitrile. The mixture rapidly exothermed to 84.5° C whereon it was removed from the oil bath and allowed to cool. An oligomer having pendant trimethoxy silane groups and a weight average molecular weight of about 900 was obtained.

A coating composition was prepared by dissolving 100 g of the above described oligomer in 100 g dry acetone and adding 5.0 g diphenyliodonium hexafluorophosphate and 0.5 g 2-chlorothioxanthone. The mixture was coated at about 5 micron thickness onto cellulose acetate butyrate and the acetone allowed to evaporate. The coating was then exposed for five minutes to a sunlamp whereon a coating showing significant resistance to scratching by steel wool was obtained.

EXAMPLE 6

A trimethoxysilane terminated poly(alkylene ether) was prepared by mixing one mole of polyoxyethylene diol having a molecular weight of about 400 with 2 moles of γ-isocyanatopropyltrimethoxysilane and stirring the mixture under substantially anhydrous conditions for about 2 hours at about 60° C. To 40 parts of the product was added 360 parts acetone, 1 part diphenyliodonium hexafluorophosphate and 0.1 part of 2-ethyl-9,10-dimethoxyanthracene. The mixture was stirred until dispersed and coated at about 5 microns onto a glass plate and exposed to a sunlamp for 5 minutes. The plate was rinsed with water and dried. On exposing the plte to the vapors from a steam bath, no fog was produced on the coated surface. Even when the plate was rinsed repeatedly with water, the antifogging properties of the coating remained.

EXAMPLE 7

To 1.5 g of 3-(2,3-epoxypropoxy)propyltrimethoxysilane was added 0.05 g diphenyliodonium hexafluorophosphate and the solution obtained was coated on a suitable substrate such as 100 micron primed polyester. The coating was exposed to an ultraviolet lamp for four minutes. The resulting coating was abraded in accordance with ASTM D968 and the abrasion obtained measured according to ASTM D1003. A percentage increase of 4% (Δ Haze) was obtained.

$$\Delta H = \frac{\text{Initial Haze} - \text{Final Haze}}{\text{Initial Haze}} \times 100$$

The coating also had an excellent resistance to abrasion by steel wool.

These values compare favorably with haze values for commercially available coating materials. Polyester (polyethylene terephthalate) displays a haze of 78%, acrylate resins 60%, Lexan 77%, and ABCITE® AR 22%. Abrasion resistant coatings made according to the teachings of U.S. Ser. No. 659,527, filed Feb. 19, 1976 from the same monomer used in this example also display haze values below 10%. The excellent abrasion resistance obtained in the practice of the present invention is surprising in view of the general difficulty in finding satisfactory catalysts for the cure of epoxy-terminated silanes and the rapidity of cure with the catalysts of the present invention.

EXAMPLE 8

When 3-(2,3-epoxypropoxy)propyltrimethoxysilane was replaced in Example 7 by a precondensate of that silane (prepared by heating a solution of 16.5 g of the silane in 16.5 g of ethanol and 8.0 g of water containing 1 drop of 0.1 N hydrochloric acid at 80° C to strip off alcohol), a haze increase of only 1.3% was obtained. The coating had excellent resistance to abrasion by steel wool.

EXAMPLE 9

When Example 7 was repeated using 2(3,4-epoxycyclohexyl)ethyltrimethoxysilane in 1.5 g of isopropanol in place of 3-(2,3-epoxypropoxy)propyltrimethoxysilane, there was obtained a scratch resistant coating having a % haze of 7.0%. The coating had excellent resistance to abrasion by steel wool.

EXAMPLE 10

Example 8 was repeated in a series of experiments in which the following catalysts were used in place of diphenyl iodonium hexafluorophosphate. The increase in haze (Δ Haze) obtained for each also is given.

| Catalyst | Δ Haze |
| --- | --- |
| a. Diphenylidonium hexafluoroantimonate | 2.9% |
| b. Diphenylidonium tetrafluoroborate | 13.7% |
| c. Diphenyliodonium hexafluorophosphate | 1.3% |
| d. Triphenylsulfonium hexafluoroantimonate | 2.8% |
| e. Triphenylsulfonium hexafluorophosphate | 1.3% |

Samples from each of the experiments also exhibited resistance to abrasion by steel wool.

EXAMPLE 11

A solution of 2 parts of a precondensate prepared as described in Example 8, 1 part of tetraethoxysilane, and 0.1 part of diphenyliodonium hexafluorophosphate in 3 parts isopropanol were coated onto a 100 micron polyester sheet and exposed to a 140 watt ultraviolet lamp for 30 seconds. The resulting coating was found to have a Δ

Haze of 2.0 when tested in accordance with ASTM D968 and D1003.

EXAMPLE 12

A solution was prepared by mixing 5 grams of a precondensate of 3-(2,3-epoxypropoxy)propyldimethoxysilane (prepared as described in Example 8), 5 grams of a precondensate of tetraethoxysilane (prepared by heating at reflux a mixture of 16.5 g tetraethoxysilane, 16.5 g ethanol and 8.0 g water containing 1 drop of 0.1 N HCl at 80° C to strip off ethanol), 1.65 g isopropanol, and 0.2 g diphenyliodonium hexafluorophosphate. The solution was coated onto a primed sheet of polymethylmethacrylate by flow coating and irradiated with an ultraviolet lamp for five minutes. An abrasion resistant coating was obtained which had a Δ Haze of 4.5.

EXAMPLE 13

Example 7 was repeated, however, adding to the coating composition 0.4 g tetraisopropyl titanate. Following exposure to the irradiation of an ultraviolet lamp, a coating having resistance to abrasion by sand and steel wool was obtained.

EXAMPLE 14

The effect of photocatalyst concentration was illustrated by adding the following concentrations of catalyst to tetraethoxysilane, coating the material onto glass and irradiating the coating for five minutes with a 140 watt ultraviolet lamp at a distance of about 20 cm.

| | |
|---|---|
| a. 0.0% $\phi_2I^+$ $PF_6^-$ | No polymerization |
| b. 0.05% " | Friable, hard coating |
| c. 0.5% " | " |
| d. 1.0% " | " |
| e. 2.0% " | " |
| f. 0.0% $\phi_3S^+SbF_6^-$ | No polymerization |
| g. 0.05% " | Friable, hard coating |
| h. 0.5% " | " |
| i. 1.0% " | " |
| j. 2.0% " | " |

EXAMPLE 15

The effectiveness of other onium salts for catalyzing the photopolymerization of hydrolyzable silicon-containing compounds is illustrated by adding 1.0% by weight of the following onium salts to tetraethoxysilane, coating the material onto glass and irradiating the coating with a 140 watt ultraviolet lamp at a distance of about 20 cm and noting the time required for formation of a tack-free surface.

| Photocatalyst | Time to Tack-Free State |
|---|---|
| a. $\phi_2(CH_3)_2N^+PF_6^-$ | 15 minutes |
| b. $\phi_4P^+PF_6^{-\,(1)}$ | |
| c. $\phi_3S^+Cl^{-\,(2)}$ | 2 hours |
| d. $\phi_2I^+Cl^{-\,(2)}$ | ~16 hours |

(1) In solution
(2) Plus 0.2% by weight 2-ethyl-9,10-dimethoxyanthracene

EXAMPLE 16

To illustrate a composition of the invention useful for providing a scratch resistant coating on photographic film, 40 parts of 1,4-bis(3,4-epoxypropoxy)butane, 60 parts of 3-(2,3-epoxypropoxy)propyltrimethoxysilane, and 1 part of diphenyliodonium hexafluorophosphate were mixed and stored in a light tight vessel where it could be kept unpolymerized for at least three months. Strips of developed 35 mm photographic film (both triacetate and polyester) were continuously coated with an about 100 micron thickness of the composition and exposed for 6 seconds to the radiation of a 140 watt ultraviolet lamp whereon a scratch resistant coating on each was obtained that had a Δ Haze of 8 to 10%.

Protection of photographic materials, including microfiche, prints, transparencies, etc. is provided not only by coating of the surface of the emulsion layers but, especially in transparent materials such as microfilm and slides, coating of the backside layer or base improves the durability of the film and resistance to scratches.

EXAMPLE 17

To 4 gm of a precondensate (by condensation of silane groups) of 3-(2,3-epoxypropoxy)propyltrimethoxysilane was added 0.2 gm of $(CH_3)_3C_6H_5N^+Cl^-$ and 0.02 gm 2-chlorothioxanthone and 2 gm of ethanol to facilitate solubility. This solution was coated on 100 micron primed polyester. The coating was exposed to a 140 watt ultraviolet lamp for 60 minutes after which time the composition had cured to a tough abrasion resistant coating. A sample of the above coated film which was allowed to set exposed only to fluorescent room lighting became tack free after 12 hours but was not abrasion resistant at that time.

What is claimed is:

1. An anhydrous, storage-stable, polymerizable composition comprising at least one hydrolyzable silane represented by the formula:

$$X_m SiR_{4-m}$$

wherein

X is a hydrolyzable group or hydrogen,

R is a hydrocarbyl group, and m is 2, 3, or 4, and an organic aromatic onium ctalyst comprising an aromatic adduct of (1) a diaromatic, triaromatic, or tetraaromatic organoatomic cation of a Group Va, VIa, or VIIa atom and (2) an anion, said onium catalyst being represented by the formula:

$$(R^2)_n\!-\!\underset{(R^1)_a}{A^+}\ X^-$$

wherein $R^2$ is an aromatic group at least as electron withdrawing as benzene, $R^1$ is an alkyl or alkenyl group, A is a Group Va, VIa, or VIIa atom, X is an anion, n is a positive whole integer of at least 2 up to the valence of A plus one, a is 0 or a positive whole integer up to the valence of A minus one, and n plus a is equal to the valence of A plus one and wherein at least two of said $R^2$ groups are bonded to A.

2. The polymerizable composition of claim 1 wherein said Group Va, VIa, or VIIa atom is selected from the group consisting essentially of phosphorous, sulfur, nitrogen, iodine or antimony.

3. The polymerizable composition of claim 2 wherein the organic aromatic catalyst is a diphenyl, triphenyl, or tetraphenyl organic adduct.

4. the polymerizable composition of claim 3 wherein the anion is selected from the group consisting of tetrafluoroborate, hexafluorophosphate, hexafluoroarsenate, hexachloroantimonate, bis(perfluoroalkylsulfonyl)methane, iodide, bromide, chloride, fluoride, sulfate, acetate, or trichloroacetate.

5. The polymerizable composition of claim 3 wherein the silane is represented by the formulae:

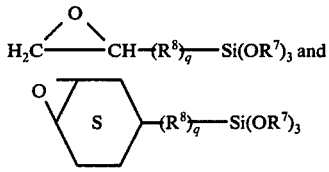

where $R^8$ is a non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, q is 0 or 1 and $R^7$ is an aliphatic hydrocarbon group of less than 10 carbon atoms, an acyl group of less than 10 carbon atoms, or a group of formula $(CH_2CH_2O)_kZ$ in which $k$ is an integer of at least 1, and Z is an aliphatic hydrocarbon group of less than 10 carbon atoms or hydrogen.

6. The polymerizable composition of claim 3 wherein the silane is represented by the formula

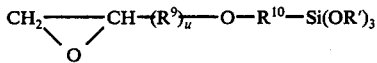

wherein $R^9$ and $R^{10}$ are independently alkylene groups of up to 4 carbon atoms, $R'$ is an alkyl group of up to 6 carbon atoms, and $u$ is 0 or 1.

7. The polymerizable composition of claim 3 wherein the silane is selected from the group consisting of dimethyldimethoxysilane, phenyltriethoxysilane, γ-aminopropyltriethoxysilane, vinyltriethoxysilane, γ-methacryloxypropyltrimethoxysilane, γ-isocyanotopropyltrimethoxysilane, 3-(2,3-epoxypropoxy)propyltrimethoxysilane, and 2(3,4-epoxycyclohexyl)ethyltrimethoxysilane.

8. The polymerizable composition of claim 1 wherein the organic aromatic catalyst is a diphenyl, triphenyl, or tetraphenyl organic adduct.

9. The polymerizable composition of claim 1 wherein the aninon is selected from the group consisting of tetrafluoroborate, hexafluorophosphate, hexafluoroarsenate, hexachloroantimonate, bis(perfluoroalkylsulfonyl)methane, iodide, bromide, chloride, fluoride, sulfate, acetate, or trichloroacetate.

10. The polymerizable composition of claim 1 wherein a is 0 and $R^2$ is a phenyl.

11. The polymerizable composition of claim 10 wherein the anion is selected from the group consisting of tetrafluoroborate, hexafluorophosphate, hexafluoroarsenate, hexachloroantimonate, bis(perfluoroalkylsulfonyl)methane, iodide, bromide, chloride, fluoride, sulfate, acetate, or trichloroacetate.

12. The polymerizable composition of claim 1 wherein said Group Va, VIa, or VIIa is selected from the group consisting essentially of phosphorus, sulfur, nitrogen, iodine or antimony, and an anion.

13. The polymerizable composition of claim 12 wherein the silane is represented by the formulae:

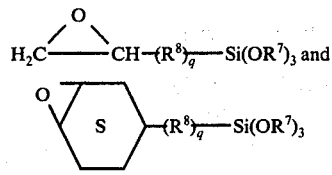

where $R^8$ is a non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, q is 0 or 1 and $R^7$ is an aliphatic hydrocarbon group of less than 10 carbon atoms, an acyl group of less than 10 carbon atoms, or a group of formula $(CH_2CH_2O)_kZ$ in which $k$ is an integer of at least 1, and Z is an aliphatic hydrocarbon group of less than 10 carbon atoms or hydrogen.

14. The polymerizable composition of claim 12 wherein the silane is represented by the formula

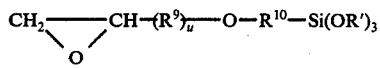

wherein $R^9$ and $R^{10}$ are independently alkylene groups of up to 4 carbon atoms, $R'$ is an alkyl group of up to 6 carbon atoms, and $u$ is 0 or 1.

15. The polymerizable composition of claim 12 wherein the silane is selected from the group consisting of dimethyldimethoxysilane, phenyltriethoxysilane, γ-aminopropyltriethoxysilane, vinyltriethoxysilane, γ-methacryloxypropyltrimethoxysilane, γ-isocyanotopropyltrimethoxysilane, 3-(2,3-epoxypropoxy)propyltrimethoxysilane, and 2(3,4-epoxycyclohexyl)ethyltrimethoxysilane.

16. The polymerizable composition of claim 12 wherein $a$ is 0 and $R^2$ is a phenyl.

17. The polymerizable composition of claim 16 wherein the anion is selected from the group consisting of tetrafluoroborate, hexafluorophosphate, hexafluoroarsenate, hexachloroantimonate, bis(perfluoroalkylsulfonyl)methane, iodide, bromide, chloride, fluoride, sulfate, acetate, or trichloroacetate.

18. The polymerizable composition of claim 1 wherein $R^2$ is a phenyl group, naphthyl group, thienyl group, pyranyl group, furanyl group or pyrazolyl group.

19. The polymerizable composition of claim 18 wherein $R^1$ is alkyl.

20. The polymerizable composition of claim 1 wherein the silane is represented by the formulae:

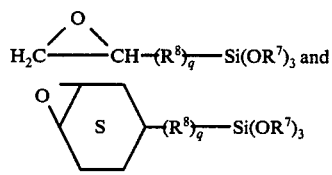

where $R^8$ is a non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, $q$ is 0 or 1 and $R^7$ is an aliphatic hydrocarbon group of less than 10 carbon atoms, an acyl group of less than 10 carbon atoms, or a group of formula $(CH_2CH_2O)_kZ$ in which $k$ is an integer of at least 1, and $Z$ is an aliphatic hydrocarbon group of less than 10 carbon atoms or hydrogen.

21. The polymerizable composition of claim 20 wherein the silane is represented by the formula

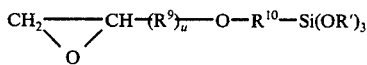

wherein $R^9$ and $R^{10}$ are independently alkylene groups of up to 4 carbon atoms, $R'$ is an alkyl group of up to 6 carbon atoms, and $u$ is 0 or 1.

22. The polymerizable composition of claim 1 wherein the silane is selected fom the group consisting of dimethyldimethoxysilane, phenyltriethoxysilane, γ-aminopropyltriethoxysilane, vinyltriethoxysilane, γ-methacryloxypropyltrimethoxysilane, γ-isocyanotopropyltrimethoxysilane, 3-(2,3-epoxypropoxy)propyltrimethoxysilane, and 2(3,4-epoxycyclohexyl)ethyltrimethoxysilane.

23. A method for the condensation of silane comprising irradiating a composition comprising:
(1) a hydrolyzable silane,
(2) a catalytic amount of $H_2O$, and
(3) an onium catalyst comprising a) a diaromatic, triaromatic, or tetraaromatic organic adduct of an organoatomic cation of a Group Va, VIa, or VIIa atom, and b) an anion,
said onium catalyst being represented by the formula:

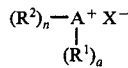

wherein $R^2$ is an aromatic group at least as electron withdrawing as benzene,
$R^1$ is an alkyl or alkenyl group,
A is a Group Va, VIa, or VIIa atom,
X is an anion,
$n$ is a positive whole integer of at least 2 up to the valence of A plus one,
$a$ is 0 or a positive whole integer up to the valence of A minus one, and
$n$ plus $a$ is equal to the valence of A plus one and wherein at least two of said $R^2$ groups are bonded to A
with at least a sufficient intensity of radiation to activate the onium catalyst and initiate the condensation reaction.

24. The method of claim 23 wherein said hydrolyzable silane is selected from the group consisting of dimethyldimethoxysilane, phenyltriethoxysilane, γ-aminopropyltriethoxysilane, vinyltriethoxysilane, γ-methacryloxypropyltrimethoxysilane, γ-isocyanotopropyltrimethoxysilane, 3-(2,3-epoxypropoxy)propyltrimethoxysilane, and 2(3,4-epoxycyclohexyl)ethyltrimethoxysilane.

25. A method for the condensation of silane according to claim 23 wherein said Group Va, VIa, or VIIa atom is selected from the group consisting essentially of phosphorous, sulfur, nitrogen, iodine, or antimony.

26. The method of claim 25 wherein said hydrolyzable silane is selected from the group consisting of dimethyldimethoxysilane, phenyltriethoxysilane, γ-aminopropyltriethoxysilane, vinyltriethoxysilane, γ-methacryloxypropyltrimethoxysilane, γ-isocyanotopropyltriemethoxysilane, 3-(2,3-epoxypropoxy)propyltrimethoxysilane, and 2(3,4-epoxycyclohexyl)ethyltrimethoxysilane.

27. The method of claim 25 wherein said hydrolyzable silane is represented by the formula

wherein X is a hydrolyzable group or hydrogen,
R is a hydrocarbyl group, and
$m$ is 2, 3, or 4.

28. The method of claim 27 wherein $m$ is 3 and R is acryloxy.

29. The method of claim 28 wherein the organic adduct is a diphenyl, triphenyl, or tetraphenyl organic adduct.

30. The method of claim 25 wherein the organic adduct is a diphenyl, triphenyl, or tetraphenyl organic adduct.

31. The method of claim 30 wherein the polymerizable silane is represented by the formulae:

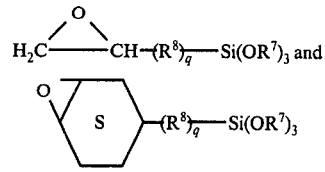

where $R^8$ is a non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, $q$ is 0 or 1 and $R^7$ is an aliphatic hydrocarbon group of less than 10 carbon atoms, an acyl group of less than 10 carbon atoms, or a group of formula $(CH_2CH_2O)_kZ$ in which $k$ is an integer of at least 1, and $Z$ is an aliphatic hydrocarbon group of less than 10 carbon atoms or hydrogen.

32. The method of claim 30 wherein said hydrolyzable silane is selected from the group consisting of dimethyldimethoxysilane, phenyltriethoxysilane, γ-aminopropyltriethoxysilane, vinyltriethoxysilane, γ-methacryloxypropyltrimethoxysilane, γ-isocyanotopropyltrimethoxysilane, 3-(2,3-epoxypropoxy)propyltrimethoxysilane, and 2(3,4-epoxycyclohexyl)ethyltrimethoxysilane.

33. The method of claim 23 wherein the organic adduct is a diphenyl, triphenyl, or tetraphenyl organic adduct.

34. The method of claim 33 wherein the polymerizable silane is represented by the formulae:

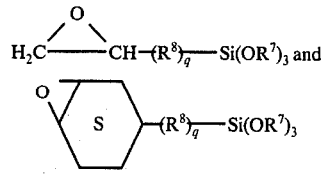

where $R^8$ is a non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, $q$ is 0 to 1 and $R^7$ is an aliphatic hydrocarbon group of less than 10 carbon atoms, an acyl group of less than 10 carbon atoms, or a group of formula $(CH_2CH_2O)_kZ$ in which $k$ is an integer of at least 1, and Z is an aliphatic hydrocarbon group of less than 10 carbon atoms or hydrogen.

35. The method of claim 23 wherein the polymerizable silane is represented by the formulae:

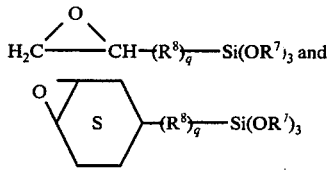

where $R^8$ is an non-hydrolyzable divalent hydrocarbon group of less than 20 carbon atoms or a divalent group of less than 20 carbon atoms the backbone of which is composed of only C, N, S, and O atoms with no two heteroatoms adjacent within the backbone of the divalent groups, $q$ is 0 or 1 and $R^7$ is an aliphatic hydrocarbon group of less than 10 carbon atoms, an acyl group of less than 10 carbon atoms, or a group of formula $(CH_2CH_2O)_kZ$ in which $k$ is an integer of at least 1, and Z is an aliphatic hydrocarbon group of less than 10 carbon atoms or hydrogen.

36. The method of claim 35 wherein the polymerizable silane is represented by the formula

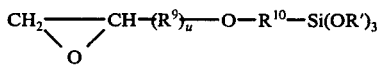

wherein $R^9$ and $R^{10}$ are independently alkylene groups of up to 4 carbon atoms, R' is an alkyl group of up to 6 carbon atoms, and $u$ is 0 or 1.

37. The method of claim 23 wherein said hydrolyzable silane is represented by the formula

wherein
X is a hydrolyzable group or hydrogen,
R is a hydrocarbyl group, and
$m$ is 2, 3, or 4.

38. the method of claim 37 wherein $m$ is 3 and R is acryloxy.

39. An anhydrous, storage-stable, polymerizable composition comprising at least one hydrolyzable silane represented by the formula:

wherein
X is a hydrolyzable group or hydrogen,
R is a hydrocarbyl group, and
$m$ is 2, 3, or 4,
and an organic aromatic onium catalyst comprising an aromatic adduct of (1) an aromatic organoatomic cation of a Group Va, VIa, or VIIa atom and (2) an anion, with the proviso that when the Group Va, VIa, or VIIa atom is a halogen atom, the organoatomic cation must be at least diaromatic, and wherein aromatic groups atached to said Group Va, VIa, or VIIa atoms are at least as electron withdrawing as benzene.

40. An anhydrous, storage-stable, polymerizable composition comprising at least one hydrolyzable silane represented by the formula:

wherein
X is a hydrolyzable group or hydrogen,
R is an acryloxy group, and
$m$ is 3,
and an organic aromatic onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

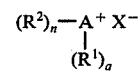

wherein
$R^2$ is an aromatic group at least as electron withdrawing as benzene,
$R^1$ is an alkyl or alkenyl group,
A is a Group Va, VIa, or VIIa atom,
X is an anion, $n$ is a positive whole integer of at least 2 up to the valence of A plus one,
$a$ is 0 or a positive whole integer up to the valence of A minus one, and
$n$ plus $a$ is equal to the valence of A plus one and wherein at least two of said $R^2$ groups are bonded to A.

41. The polymerizable composition of claim 40 wherein the organic aromatic catalyst is a diphenyl, triphenyl, or tetraphenyl organic adduct.

42. The polymerizable composition of claim 41 wherein said Group Va, VIa, or VIIa atom is selected from the group consisting of phosphorous, sulfur, nitrogen, iodine, or antimony.

43. The polymerizable composition of claim 42 wherein X is selected from the group consisting of tetrafluoroborate, hexafluorophosphate, hexafluoroarsenate, hexachloroantimonate, bis(perfluoroalkylsulfonyl)methane, iodide, bromide, chloride, fluoride, sulfate, acetate, and trichloroacetate.

44. An anhydrous, storage-stable, polymerizable composition comprising at least one hydrolyzable silane represented by the formula:

wherein
X is a hydrolyzable group or hydrogen,
R is a hydrocarbyl group, and
$m$ is 2, 3, or 4, and a catalyst capable of curing the silane in the presence of water after exposure to radiation, said catalyst consisting essentially of an organic aromatic onium catalyst comprising an aromatic adduct of (1) a diaromatic, triaromatic, or tetraaromatic organoatomic cation of a Group Va, VIa, or VIIa atom and (2) an anion, said onium catalyst being represented by the formula:

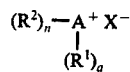

wherein
R² is an aromatic group at least as electron withdrawing as benzene,
R is an alkyl or alkenyl group,
A is a Group Va, VIa, or VIIa atom,
X is an anion,
n is a positive whole integer of at least 2 up to the valence of A plus one,
a is 0 or a positive whole integer up to the valence of A minus one, and
n plus a is equal to the valence of A plus one and wherein at least two of said R² groups are bonded to A.

* * * * *

UNITED STATES PATENT AND TRADEMARK OFFICE
CERTIFICATE OF CORRECTION

PATENT NO. : 4,101,513
DATED : July 18, 1978
INVENTOR(S) : Fox, Noren and Krankkala It is certified that error appears in the above-identified patent and that said Letters Patent are hereby corrected as shown below:

Column 2, line 40, "raidcal" should be --radical--;

Column 3, line 13, --and-- should be inserted before "a polymer having . . .";

Column 3, line 54, --*-- should be inserted after "anion.";

Column 8, line 57, --The aromatic iodonium salts are of the formulae:-- should be inserted before the chemical formula.;

Column 9, line 7, "ets." should be --etc.--;

Column 11, line 61, "plte" should be --plate--;

Column 14, line 39, "ctalyst" should be --catalyst--.

Signed and Sealed this

Twenty-sixth Day of February 1980

[SEAL]

Attest:

SIDNEY A. DIAMOND

Attesting Officer  Commissioner of Patents and Trademarks